Feb. 24, 1970 G. A. SCHELL 3,497,236
AUTOMOBILE STABILIZER
Filed Aug. 28, 1968
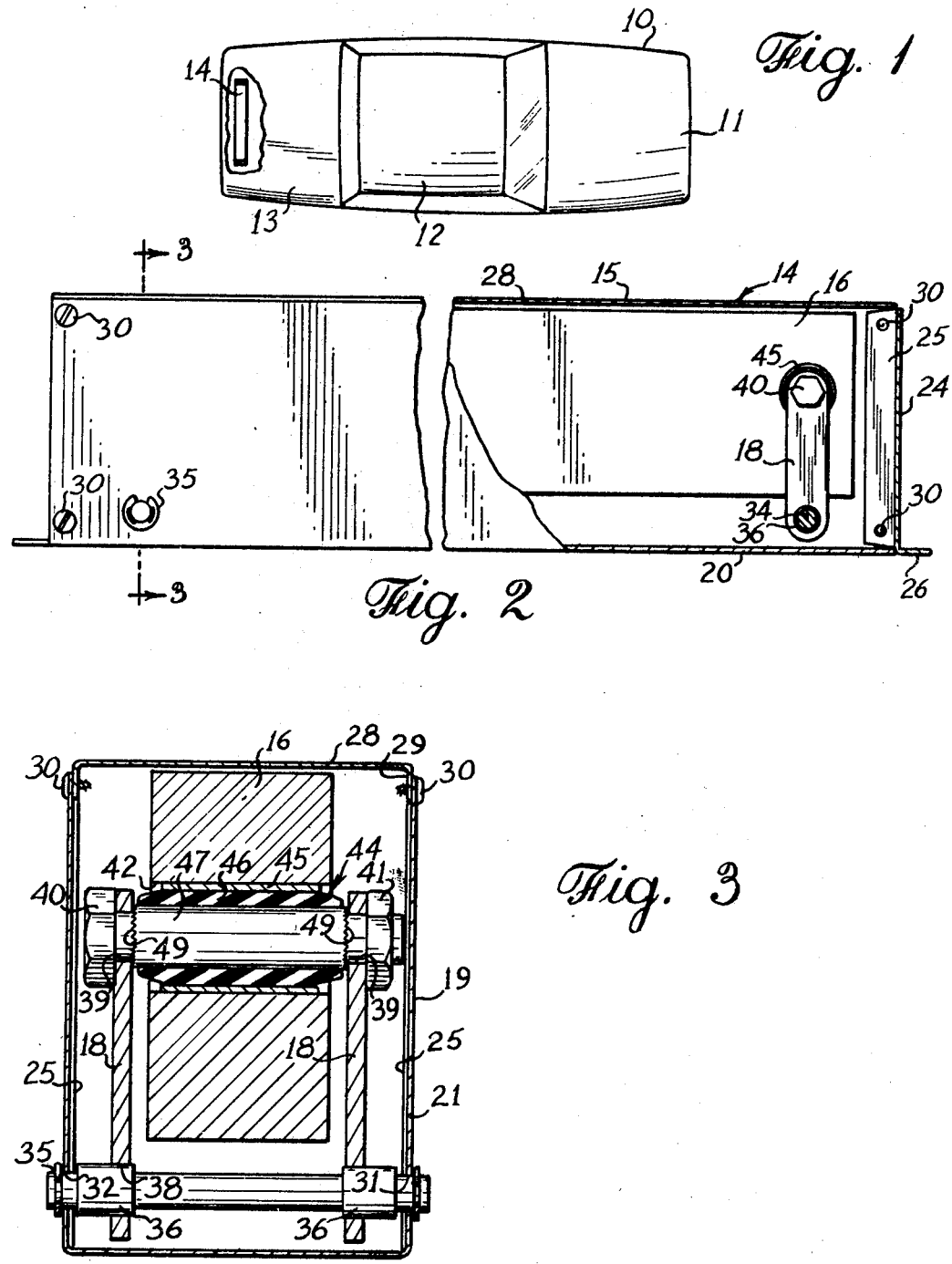
INVENTOR.
Gene A. Schell
BY Jones & Thomas
ATTORNEYS

United States Patent Office 3,497,236
Patented Feb. 24, 1970

3,497,236
AUTOMOBILE STABILIZER
Gene A. Schell, 62 Calio Drive SW.,
Marietta, Ga. 30060
Filed Aug. 28, 1968, Ser. No. 755,876
Int. Cl. B60r 27/00; B60g 25/00
U.S. Cl. 280—150      2 Claims

ABSTRACT OF THE DISCLOSURE

An automobile stabilizer comprising an elongated weight movably supported by legs in the rear of the vehicle. The legs are rotatably connected to the weight by means of rubber sleeve springs in such a manner that the weight is movable laterally of the longitudinal centerline of the vehicle.

BACKGROUND OF THE INVENTION

When an automobile rounds a curve, the centrifugal forces on the vehicle tend to pull the vehicle into a skid so that the rear wheels slide to the outside of the curve beyond the path of the front steerable wheels, and the vehicle goes out of control. Of course, centrifugal skidding is more prevelent under wet or icy road conditions and other slippery road conditions which may be unexpected and unavoidable when only smaller centrifugal forces are necessary to start a skid. While various safety devices have been developed in an effort to reduce centrifugal skidding and the resulting vehicle accidents, the devices developed so far have been expensive to construct, must be delicately adjusted before attachment to a vehicle, and do not function well under conditions where only small centrifugal forces function to cause skidding.

While stabilizers for automobiles and similar vehicles have been developed which include spring mounted weights which are movable laterally of the expected travel of the vehicle and which partially compensate for the centrifugal forces exerted on a skidding vehicle, the previously known stabilizers have been prohibitably expensive and ineffective at low vehicle speeds where smaller centrifugal forces function to place a vehicle in a skid.

SUMMARY OF THE INVENTION

Briefly described, the present invention comprises a stabilizer for automobiles and similar vehicles which reduce the tendency of the vehicles to skid when rounding a curve, both at low and high speeds. A weight which is mounted so that it can move laterally of the longitudinal centerline of the vehicle compensates for the centrifugal forces exerted on the vehicle when rounding a curve and experiencing a lateral skid of the rear wheels. The weight is effective to reduce the centrifugal forces of the vehicle in the vicinity of the rear wheels, to stop the skid of the rear wheels across the ground or road surface, thus enabling the driver to regain proper traction and control of the vehicle. The weight is supported in such a manner that its initial lateral movement from its normal centered position requires a minimum of force in comparison to the previously known stabilizers, which helps to damper a low speed skid, or any skid where only small centrifugal forces are acting on the vehicle.

Thus, it is an object of this invention to provide a stabilizer for automobiles or the like which functions to reduce the tendency of the automobile to skid when rounding curves at both low and high speeds.

Another object of this invention is to provide a stabilizer for automobiles which is durable, inexpensive to manufacture, easy to assemble, and which is effective to reduce centrifugal skidding of an automobile.

Other objects, features and advantages of the present invention will become apparent upon reading the following specification when taken in conjunction with the accompanying drawing.

BRIEF DESCRIPTION OF THE DRAWING

FIGURE 1 is a plan view of an automobile illustrating tthe location and position of a stabilizer on the automobile.

FIGURE 2 is a side elevational view, with parts broken away, of the stabilizer.

FIGURE 3 is an end view of the stabilizer, in cross-section, taken along lines 3—3 of FIGURE 2.

DESCRIPTION OF THE PREFERRED EMBODIMENTS

Referring now in more detail to the drawing, in which like numerals indicate like parts throughout the several views, FIGURE 1 shows an automobile or similar vehicle 10 having the usual engine compartment 11, passenger section 12, and trunk 13. Stabilizer 14 is positioned in trunk 13, or can be positioned beneath the vehicle below trunk 13.

As is shown in FIGURE 2, automobile stabilizer 14 includes housing 15, stabilizing weight 16, and support legs 18. Housing 15 is generally of rectangular configuration and includes a U-shaped body portion 19 (FIG. 3) which includes base 20 and upwardly extending side walls 21 and 22. End walls 24 includes inwardly turned side flanges 25 which are mated with side walls 21 and 22, and outwardly turned bottom flange 26 which is coextensive with base 20. Cover 28 includes downwardly turned edges 29 which mate with the upper portion of each side wall 21. Side flanges 25 of end walls 24 and edges 29 of cover 28 are connected to side walls 21 and 22 of U-shaped body portion 19 by means of screws 30, to hold the elements of housing 14 in rigid connection with one another.

As is shown in FIGURES 2 and 3, side walls 21 and 22 of housing 15 define openings 31 and 32 in their lower portion adjacent base 20, and at each end of the housing. The openings 31 at each end of side wall 21 are in alignment with the corresponding openings 32 of side wall 22. A hinge pin 34 of a length longer than the width of housing 15 is inserted through each of the parts of aligned openings 31 and 32, and held in place at each end by snap rings 35. Bearings 36 extend about each end of each hinge pin 34, within housing 15 adjacent side walls 21 and 22 of housing 15, and support legs 18 are each mounted on bearings 36 by the apertures 38 of support legs 18 surrounding bearings 36. The upper ends of support legs 18 also define apertures 39. Support legs 18 of each hinge pin 34 are positioned parallel to each other so that their apertures 39 are aligned with each other and the shank of a bolt 40 is inserted through apertures 39. Nut 41 retains bolt 40 in this position.

Weight 16 is mounted on bolts 40 of support legs 18. Weight 16 is of elongated rectangular configuration and defines support bores 42 at each of its ends. A torsion bushing or sleeve spring 44 is inserted into each of the support bores 42 of weight 16. Bushing 44 includes outer metallic sleeve 45, intermediate elastic sleeve 46, and inner metallic sleeve 47. Elastic sleeve 46 has its outer annular surface connected to the inside annular surface of outer metallic sleeve 45, and has its inner annular surface connected to the outer annular surface of inner metallic sleeve 47. Thus, inner sleeve 47 is rotatable and movable with respect to outer sleeve 45 only by distorting intermediate elastic sleeve 46. The ends of inner metallic sleeve 47 are serrated at 49, and inner sleeve 47 is rigidly connected to support legs 18 by bolt 40 and nut 41 compressing support legs 18 into frictional engagement against serrations 49. Thus, support legs 18 are movable with respect to weight 16 by distortion of intermediate flexible sleeve 46.

OPERATION

Automobile stabilizer 14 is connected to the rear of an automobile 10, preferably at a point well displaced behind the rear wheels of the vehicle. Stabilizer 14 can be positioned in the trunk, or suspended below the vehicle in any convenient location; however, weight 16 of stabilizer 14 must be positioned so its direction of movement with respect to vehicle 10 is laterally of the expected direction of movement of the vehicle, or the longitudinal centerline of the vehicle.

Upon assembling stabilizer 14, bushings 44 are pressed into support bores 42 at each end of weight 16. Bolts 40 are inserted through each bushing 44 with support legs 18 being carried on opposite sides of weight 16 by each bolt. Nut 41 is loosely fastened to bolt 40. This assembly is then placed inside a U-shaped body portion 19 of a housing 15, and hinge pins 34 are inserted through apertures 31 and 32 of the side walls of the housing 15, and through apertures 39 of support legs 18, so that each hinge pin 34 supports both support legs of one end of weight 16. Snap rings 35 are inserted over the protruding portions of the hinge pins 34 to hold the assembly within the housing. Weight 16 is then pivoted about hinge pins 34 as a parallel linkage until it is in an upright attitude and where its support legs 18 extend directly away from the base 20 of the housing, and nut 41 of each bushing 44 is then tightened onto its bolt 40, to lock support legs 18 to the inner sleeve 47 of each bushing 44. At this point, weight 16 is properly positioned and maintained within the housing in an upright attitude with no further adjustment being necessary. End walls 24 and cover 28 are then connected to U-shaped body portion 19 by means of screws 30, and stabilizer 14 is ready for attachment to an automobile.

The characteristics of bushing 44 are such that inner sleeve 47 can be moved or rotated with respect to outer sleeve 45 relatively freely upon initial rotation; however, further rotation of the sleeves with respect to each other becomes progressively more difficult. Thus, weight 16 is movable about the axis of hinge pins 34 a substantial distance with only a small resistance from flexible sleeves 46. Further movement of weight 16 about hinge pins 34 meets with increased resistance from flexible sleeve 46.

Since weight 16 is relatively easy to move within housing 15 upon its initial movement, only a small centrifugal force exerted on automobile 10 is required to move weight 16 within its housing. Thus, when automobile 10 rounds a shallow curve or a sharper curve at slower speeds where only relatively small centrifugal forces are felt, weight 16 will react with the rest of the vehicle under the influence of centrifugal forces, so that weight 16 is moved toward the outside of the curve. If the rear wheels of the vehicle begin to skid, the vehicle virtually moves from beneath weight 16 toward the outside of the curve, which reduces the total centrifugal force felt by the vehicle, and thus reduces the tendency of the vehicle to skid. Also, a stabilizing vibration is set up which functions to stabilize the vehicle.

While bushings 44 are highly effective in low speed or shallow curve condition to compensate for the smaller centrifugal forces, they are also effective during the higher speed, sharper curve conditions and larger centrifugal forces since the spring characteristics of the bushing are such that their resistance to further twisting or the further movement of weight 16 within housing 15 increases. Thus, the overall effect of stabilizer 14 is that it is effective under high and low centrifugal forces to prevent centrifugal skidding.

It should be understood that an automobile can go into a skid when both relatively small centrifugal forces and relatively large centrifugal forces are encountered. For instance, when an automobile skids on ice, only small centrifugal forces are required to have the rear wheels of the vehicle lose traction; whereas, under dry, high traction conditions, extremely large centrifugal forces may be required for the vehicle to go into a centrifugal skid. The spring characteristics of bushing 44 compensate for centrifugal skidding from low to high centrifugal forces.

The construction of stabilizer 14 is such that weight 16 is approximately the same shape as housing 15 and substantially fills the housing and only a minimum amount of space in housing 15 is required to accommodate weight 16 and its movement. Flexible sleeves 46 of bushings 44 are not under any torsion forces or other stress until stabilizer 14 feels a lateral centrifugal force, at which time stabilizer 14 is ready to compensate for lateral skidding.

It will be obvious to those skilled in the art that many variations may be made in the embodiments chosen for the purpose of illustrating the present invention without departing from the scope thereof.

What is claimed is:

1. An automobile stabilizer for mounting horizontally in a transverse position at the rear end of an automobile or the like at substantially right angles to the longitudinal axis of the automobile, said stabilizer comprising a virtually closed oblong housing including substantially flat bottom, top, side and end walls, pivot pins extending parallel to each other across each end of said housing adjacent said bottom wall and connected at their ends to said side walls, support arms rotatably connected at their ends to each end of each of said pivot pins and extending parallel to each other in an upward direction toward said top wall, an oblong weight element generally conforming in shape to said housing positioned in said housing between the support arms at the ends of each pivot pin, a torsion spring extending through each end of said weight element, each of said torsion springs comprising an outer hardened sleeve rigidly connected to said weight element, an inner hardened sleeve rigidly connected at its ends to the support arms of one of said pivot pins, and an intermediate elastic annular sleeve fixedly connected to the inside surface of said outer hardened sleeve and to the outer surface of said inner hardened sleeve, whereby said torsion springs yieldingly resist with progressively increasing resistance the movement of said weight element on the support arms about the pivot pins as the support arms are moved away from an upright attitude, and the weight of the weight element progressively assists the movement of weight element on the support arms about the pivot pins as the support arms are moved away from an upright attitude.

2. The invention of claim 1 wherein said inner metal sleeves are serrated at each of their ends and pressed into locking engagement with said legs.

References Cited

UNITED STATES PATENTS

| 2,942,459 | 1/1960 | Schilling | 267—1 |
| 2,990,193 | 1/1961 | Heard | 280—150 |
| 3,036,858 | 5/1962 | Fingerut | 280—150 |

FOREIGN PATENTS 1,092,489   4/1955   France.

LEO FRIAGLIA, Primary Examiner

ROBERT R. SONG, Assistant Examiner